(12) United States Patent
Uchide

(10) Patent No.: US 11,328,006 B2
(45) Date of Patent: May 10, 2022

(54) WORD SEMANTIC RELATION ESTIMATION DEVICE AND WORD SEMANTIC RELATION ESTIMATION METHOD

(71) Applicant: Mitsubishi Electric Corporation, Tokyo (JP)

(72) Inventor: Hayato Uchide, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 149 days.

(21) Appl. No.: 16/648,473

(22) PCT Filed: Oct. 26, 2017

(86) PCT No.: PCT/JP2017/038791
§ 371 (c)(1),
(2) Date: Mar. 18, 2020

(87) PCT Pub. No.: WO2019/082362
PCT Pub. Date: May 2, 2019

(65) Prior Publication Data
US 2020/0234009 A1    Jul. 23, 2020

(51) Int. Cl.
*G06F 17/00* (2019.01)
*G06F 16/33* (2019.01)
(Continued)

(52) U.S. Cl.
CPC ........ *G06F 16/3347* (2019.01); *G06F 40/237* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 8,571,850 B2* | 10/2013 | Li | G06F 40/242 |
| | | | 707/769 |
| 2015/0227505 A1* | 8/2015 | Morimoto | G06F 40/30 |
| | | | 704/9 |

(Continued)

FOREIGN PATENT DOCUMENTS

| JP | 5936698 B2 | 6/2016 |
|---|---|---|
| WO | WO 2014/033799 A1 | 3/2014 |

OTHER PUBLICATIONS

European Summons to Attend Oral Proceedings Pursuant to Rule 115(1) EPC for European Application No. 17 929 667.8, dated May 3, 2021.

(Continued)

*Primary Examiner* — Satwant K Singh
(74) *Attorney, Agent, or Firm* — Birch, Stewart, Kolasch & Birch, LLP

(57) ABSTRACT

The following units are included: a word search unit searching a database for each of words included in an input word pair; a word vector extracting unit extracting a word vector corresponding to each of the searched words from a word vector database; a character vector converting unit converting characters included in the word pair into a character vector; a feature amount acquiring unit acquiring a feature amount by combining the extracted word vector of each of the words and the character vector generated by converting the characters; and an estimation unit estimating a semantic relation between the words from the acquired feature amount.

5 Claims, 8 Drawing Sheets

(51) Int. Cl.
*G06F 40/30* (2020.01)
*G06F 40/237* (2020.01)

(56) References Cited

U.S. PATENT DOCUMENTS

2018/0018317 A1* 1/2018 Cheng .................... G06F 40/30
2018/0203921 A1* 7/2018 Privault ............. G06F 16/3323

OTHER PUBLICATIONS

Mikolov et al., "Efficient Estimation of Word Representations in Vector Space", ICLR, 2013, pp. 1-17.
Weeds et al., "Learning to Distinguish Hypernyms and Co-Hyponyms", Proceedings of Co Ling 2014, the 25th International Conference on Computational Linguistics: Technical Papers, Aug. 23-29, 2014, pp. 2249-2259.
Weston et al., "Multi-class Support Vector Machines", Technical Report, CSD-TR-98-04, May 20, 1998, pp. 1-11.
Extended European Search Report issued in corresponding European Application No. 17 929 667.8 dated Jul. 13, 2020.

* cited by examiner

WORD SEMANTIC RELATION ESTIMATION DEVICE AND WORD SEMANTIC RELATION ESTIMATION METHOD

TECHNICAL FIELD

The present invention relates to technology for estimating a semantic relation of words.

BACKGROUND ART

In recent years, the amount of electronic documents accessible by users is increasing with spread of personal computers and the Internet. There is a need for technology for efficiently finding a document desired by a user from a large amount of document information. In technology that handles natural languages represented by document search technology, it is demanded to appropriately handle ambiguity of a language, that is, polysemy or synonymy. Polysemy means that there are multiple meanings for the same word, which causes noise. Meanwhile, synonymy means that there are multiple words having the same meaning, which causes omission, that is, oversight of information.

A thesaurus that classifies words in consideration of vertical relations of a hierarchy or the like is a language resource for absorbing linguistic fluctuations in a document and solving problems of polysemy or synonymy, and is used in various language processing applications. Meanwhile, since it is costly to manually create a thesaurus, it is attempted to automatically create a thesaurus from text data. Non-Patent Literature 1 proposes a statistical model learning method for estimating a semantic relation between words using an existing thesaurus as a correct answer.

Furthermore, Non-Patent Literature 1 discloses technology to use a word vector obtained by converting a word into multidimensional numerical vectors as a feature amount used for learning a statistical model for estimating a semantic relation such as vertical or horizontal relations between two words (hereinafter referred to as the word pair). Here, as the technology for converting into a word vector, for example, as disclosed in Non-Patent Literature 2, a method of converting into dense multidimensional numerical vectors representing the meaning of the word by using the positional relationship of the word in a sentence in consideration of the context is applied. In a case where the method disclosed in Non-Patent Literature 2 is applied as the technology for converting into a word vector, there is a disadvantage that a correct semantic relation may not be estimated for a word pair including words that can be antonyms since words having different meanings that appear in a similar context, such as antonyms, are converted into similar word vectors.

As technology for solving this problem, Patent Literature 1 discloses a word meaning relationship extraction device for calculating context-based similarity, notation-based similarity, and pattern-based similarity for any word pair in a text, generating feature vectors including the calculated plurality of types of similarities as elements, and identifying a semantic relation between the words.

CITATION LIST

Patent Literatures

Patent Literature 1: WO 2014/033799

NON-PATENT LITERATURES

Non-Patent Literature 1: Julie Weeds et al., "Learning to Distinguish Hypernyms and Co-Hyponyms", COLING, 2014.

Non-Patent Literature 2: Tomas Mikolov, Kai Chen, Greg Corrado, and Jeffrey Dean, "Efficient Estimation of Word Representations in Vector Space", ICLR 2013.

SUMMARY OF INVENTION

Technical Problem

However, the technology disclosed in the Patent Literature 1 described above has a disadvantage that the method of calculating the similarities is sparse and that the feature vectors having the similarities as elements may not be a valid feature amount.

The present invention has been made to solve the problem as described above, and an object of the present invention is to acquire a valid feature amount for identifying semantic relation between words and to improve the accuracy of estimating a semantic relation between two words that can be antonyms.

Solution to Problem

A word semantic relation estimation device according to the present invention includes: a word search unit searching a database for each of words included in a word pair input to the word semantic relation estimation device; a word vector extracting unit extracting a word vector corresponding to each of the words searched by the word search unit from the database; a character vector converting unit converting characters included in the word pair into a character vector; a feature amount acquiring unit acquiring a feature amount by combining the word vector of each of the words extracted by the word vector extracting unit and the character vector generated by converting the characters by the character vector converting unit; and an estimation unit estimating a semantic relation between the words from the feature amount acquired by the feature amount acquiring unit.

Advantageous Effects of Invention

According to the present invention, it is possible to acquire a valid feature amount for identifying a semantic relation between words. As a result, it is possible to improve the accuracy of estimating a semantic relation between two words that can be antonyms.

DESCRIPTION OF EMBODIMENTS

To describe the invention further in detail, some embodiments for carrying out the invention will be described below with reference to the accompanying drawings.

First Embodiment

Figure 1:
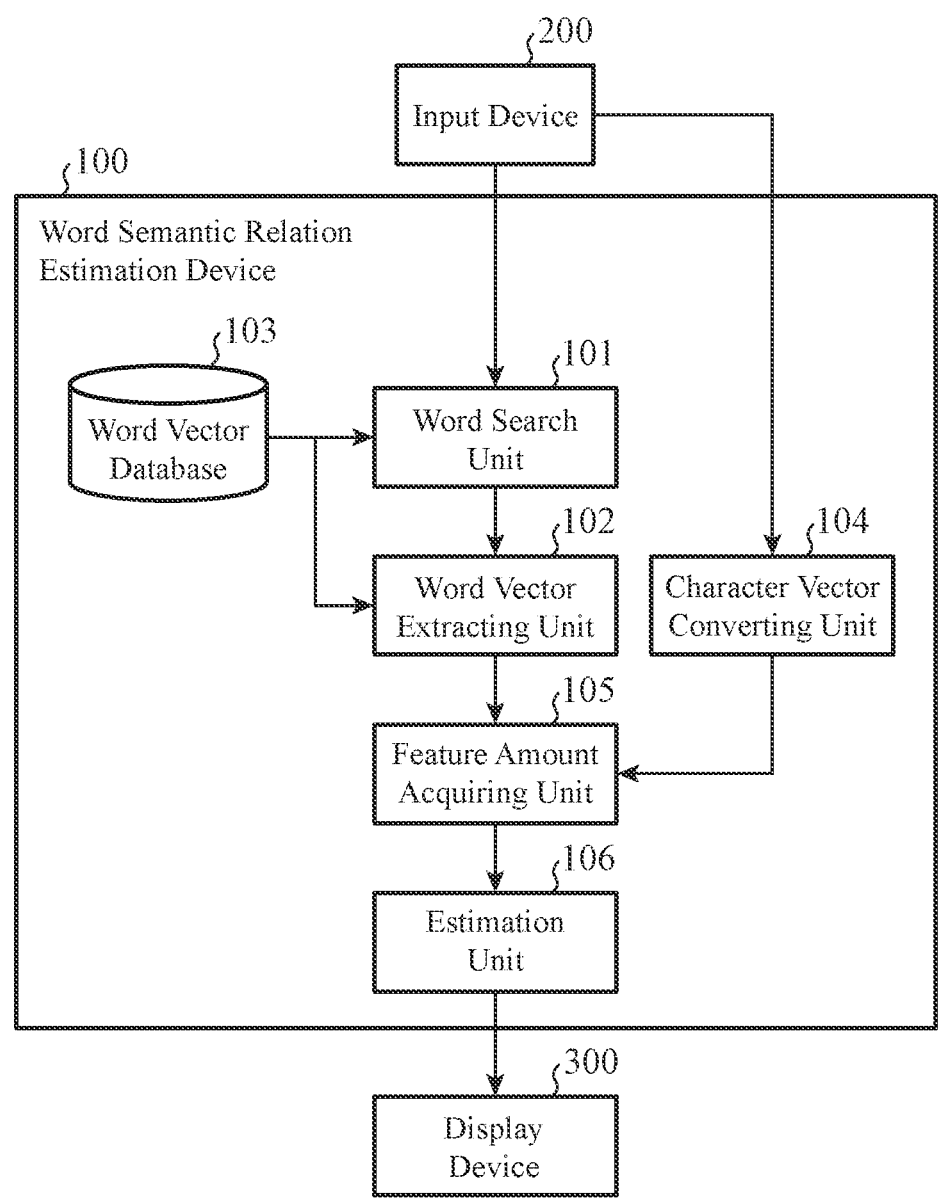
FIG. 1 is a block diagram illustrating a configuration of a word semantic relation estimation device according to a first embodiment.

FIG. 1 is a block diagram illustrating a configuration of a word semantic relation estimation device 100 according to a first embodiment.

The word semantic relation estimation device 100 includes a word search unit 101, a word vector extracting unit 102, a word vector database (database) 103, a character vector converting unit 104, a feature amount acquiring unit 105, and an estimation unit 106.

The word semantic relation estimation device 100 is connected with an input device 200 and a display device 300. The input device 200 includes, for example, a mouse or a keyboard. The display device 300 includes a display, for example.

The word search unit 101 searches the word vector database 103 for each of two words (hereinafter referred to as a word pair) that can be antonyms input from the input device 200. The word search unit 101 outputs the search result to the word vector extracting unit 102. The word vector extracting unit 102 extracts a word vector corresponding to each of the words retrieved by the word search unit 101 from the word vector database 103. The word vector extracting unit 102 outputs the extracted word vector to the feature amount acquiring unit 105. The word vector database 103 is generated using text data on the web or the like. For the creation of the word vector database 103, known technology disclosed in Non-Patent Literature 2 described before can be used. The word vector database 103 includes various words and word vectors corresponding to the words. The word vector database 103 may be provided in an external device.

The character vector converting unit 104 converts characters included in the word pair input from the input device 200 into a multidimensional vector to acquire a character vector. The character vector converting unit 104 outputs the acquired character vector to the feature amount acquiring unit 105. The known technology disclosed in Non-Patent Literature 2 can be used as a method of generating a character vector. The character vector converting unit 104 may refer to a character vector database (not illustrated) in which characters and a character vector are stored in association with each other, or may learn a character vector at the time of learning by an estimator configured using a machine learning algorithm described later.

The feature amount acquiring unit 105 combines the word vectors of the two words extracted by the word vector extracting unit 102 and the character vector obtained by the conversion by the character vector converting unit 104. For example, when the feature amount acquiring unit 105 combines word vectors (100 dimensions) and a character vector (50 dimensions), a 150-dimensional vector is generated. The feature amount acquiring unit 105 generates a feature amount, in which the character vector representing the meaning of the characters is added to the word vectors, by combining the word vectors and the character vector. With the feature amount acquiring unit 105 generating the feature amount obtained by adding the character vector to the word vectors, it becomes possible to discriminate, from the character vector, the difference in meaning of a word pair including words that can be antonyms, a difference of which is difficult to be discriminated only from the word vector.

For example, words of "stable" and "unstable" are used in similar contexts. Therefore, for example in a case where the words "stable" and "unstable" are converted into word vectors by applying the method disclosed in Non-Patent Literature 2, the two words are converted into similar word vectors. It is thus difficult to discriminate the difference in meaning between the two words from the word vectors.

On the other hand, in the first embodiment, since the feature amount acquiring unit 105 combines the word vectors of the two words and the character vector, the character vector of "un" is recognized as a difference between the two words, thereby allowing the difference in meaning of the two words can be discriminated from the character vector. The feature amount acquiring unit 105 outputs the feature amount obtained by the combining to the estimation unit 106.

The estimation unit 106 inputs the feature amount input from the feature amount acquiring unit 105 to an estimator, and estimates the semantic relation of the word pair. Here, the estimator is configured by supervised learning using a thesaurus that clearly indicates the semantic relation between words such as WordNet as training data. Specifically, the estimation unit 106 configures a binary classifier that estimates a vertical and horizontal relation label as "1" and estimates others as "0" for a word pair input thereto. Alternatively, the estimation unit 106 may configure a multi-class classifier using an above class label, a below class label, and a horizontal class label. Any method can be applied as the learning method of the estimator. For example, the One versus Rest (One-against-the-Rest) strategy disclosed in Reference Literature 1 below can be applied.

* Reference Literature 1

J. Weston and C. Watkins, "Multi-class support vector machines", Royal Holloway Technical Report CSD-TR-98-04, 1998.

Note that, although the word semantic relation estimation device 100 includes the word vector database 103 in FIG. 1, the configuration is not limited thereto. In the word semantic relation estimation device 100, the word search unit 101 or the word vector extracting unit 102 may access a storage device (not illustrated) on the cloud, instead of the word vector database 103, via a communication interface (not illustrated).

Next, a hardware configuration example of the word semantic relation estimation device 100 will be described.

Figure 2A:
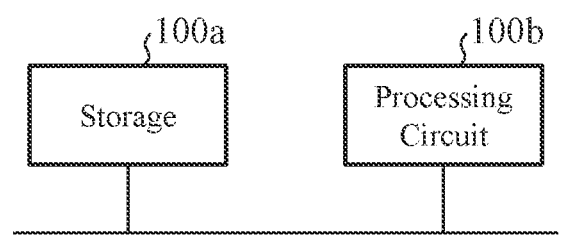
FIGS. 2A and 2B are diagrams each illustrating an exemplary hardware configuration of the word semantic relation estimation device according to the first embodiment.
Figure 2B:
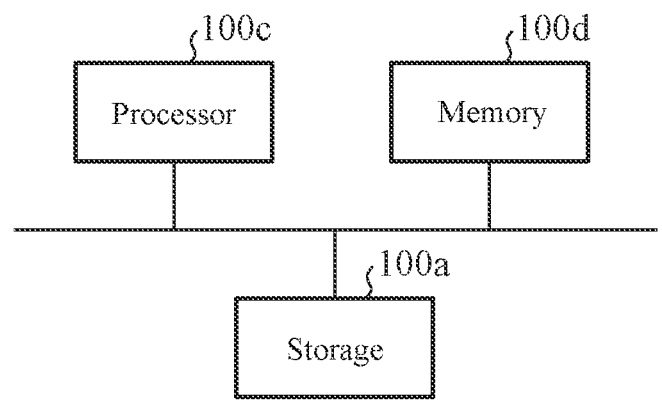

FIGS. 2A and 2B are diagrams each illustrating an exemplary hardware configuration of the word semantic relation estimation device 100 according to the first embodiment.

The word vector database 103 in the word semantic relation estimation device 100 is implemented by a storage 100a. The functions of the word search unit 101, the word vector extracting unit 102, the character vector converting unit 104, the feature amount acquiring unit 105, and the estimation unit 106 in the word semantic relation estimation device 100 are implemented by a processing circuit. That is, the word semantic relation estimation device 100 includes the processing circuit for implementing the above functions. The processing circuit may be a processing circuit 100b which is dedicated hardware as illustrated in FIG. 2A, or may be a processor 100c for executing programs stored in a memory 100d as illustrated in FIG. 2B.

In the case where the word search unit 101, the word vector extracting unit 102, the character vector converting unit 104, the feature amount acquiring unit 105, and the estimation unit 106 are implemented by dedicated hardware as illustrated in FIG. 2A, the processing circuit 100b corresponds to, for example, a single circuit, a composite circuit, a programmed processor, a parallel-programmed processor, an application specific integrated circuit (ASIC), a field-programmable gate array (FPGA), or a combination thereof. Each of the functions of the word search unit 101, the word vector extracting unit 102, the character vector converting unit 104, the feature amount acquiring unit 105, and the estimation unit 106 may be implemented by a processing circuit, or the functions of the respective units may be collectively implemented by one processing circuit.

As illustrated in FIG. 2B, in the case where the word search unit 101, the word vector extracting unit 102, the character vector converting unit 104, the feature amount acquiring unit 105, and the estimation unit 106 are implemented by the processor 100c, the functions of the respective units are implemented by software, firmware, or a combination of software and firmware. The software or the firmware is described as a program and stored in the memory 100d. By reading out and executing the program stored in the memory 100d, the processor 100c implements the functions of the word search unit 101, the word vector extracting unit 102, the character vector converting unit 104, the feature amount acquiring unit 105, and the estimation unit 106. That is, the word search unit 101, the word vector extracting unit 102, the character vector converting unit 104, the feature amount acquiring unit 105, and the estimation unit 106 include the memory 100d for storing a program execution of which by the processor 100c results in execution of steps illustrated in FIG. 3, which will be described later. In addition, it can be said that these programs cause a computer to execute the procedures or methods of the word search unit 101, the word vector extracting unit 102, the character vector converting unit 104, the feature amount acquiring unit 105, and the estimation unit 106.

Here, the processor 100c may be, for example, a central processing unit (CPU), a processing device, an arithmetic device, a processor, a microprocessor, a microcomputer, a digital signal processor (DSP), or the like.

The memory 100d may be a nonvolatile or volatile semiconductor memory such as a random access memory (RAM), a read only memory (ROM), a flash memory, an erasable programmable ROM (EPROM), an electrically EPROM (EEPROM), a magnetic disk such as a hard disk or a flexible disk, or an optical disk such as a mini disk, a compact disc (CD), or a digital versatile disc (DVD).

Note that some of the functions of the word search unit 101, the word vector extracting unit 102, the character vector converting unit 104, the feature amount acquiring unit 105, and the estimation unit 106 may be implemented by dedicated hardware and some thereof may be implemented by software or firmware. In this manner, the processing circuit in the word semantic relation estimation device 100 can implement the above functions by hardware, software, firmware, or a combination thereof.

Next, an operation of the word semantic relation estimation device 100 will be described.

Figure 3:
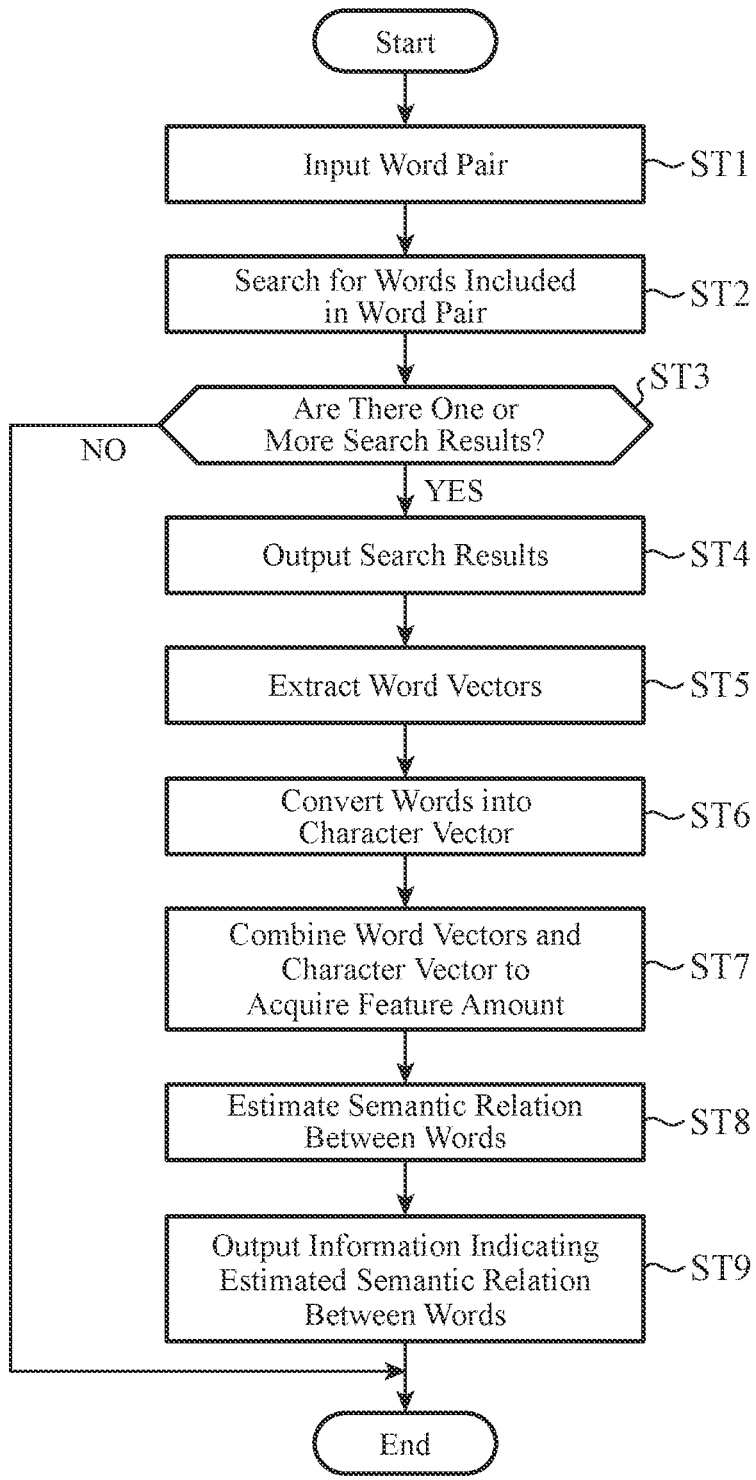
FIG. 3 is a flowchart illustrating an operation of the word semantic relation estimation device according to the first embodiment.

FIG. 3 is a flowchart illustrating the operation of the word semantic relation estimation device 100 according to the first embodiment.

When a word pair is input from the input device 200 (step ST1), the word search unit 101 searches for each of the words included in the input word pair from the word vector database 103 (step ST2). The word search unit 101 determines whether there are one or more search results in step ST2 for each of the words (step ST3). In the determination processing of step ST3, for example in a case where the word pair includes a first word and a second word, it is determined whether there are one or more search results for both of the first word and the second word. If there is no search result (step ST3: NO), the word search unit 101 ends the processing.

On the other hand, if there are one or more search results (step ST3: YES), the word search unit 101 outputs the search results to the word vector extracting unit 102 (step ST4). In the processing of step ST4, for example, if there are one or more search results for both of the first word and the second word, the search results of the first word and the second word are output to the word vector extracting unit 102. The word vector extracting unit 102 extracts word vectors corresponding to the words of the search results input in step ST4 from the word vector database 103 (step ST5). The word vector extracting unit 102 outputs the word vector extracted in step ST5 to the feature amount acquiring unit 105.

The character vector converting unit 104 divides the words included in the word pair input in step ST1 into units of characters and converts them into a character vector (step ST6). The character vector converting unit 104 outputs the character vector generated by the conversion to the feature amount acquiring unit 105.

The feature amount acquiring unit 105 combines the word vectors extracted in step ST5 and the character vector obtained by the conversion in step ST6 to acquire a feature amount (step ST7). The feature amount acquiring unit 105 outputs the feature amount acquired in step ST7 to the estimation unit 106. The estimation unit 106 estimates the semantic relation between the words from the feature amount input from the feature amount acquiring unit 105 using a word meaning estimator which is configured in advance (step ST8). The estimation unit 106 outputs information indicating the semantic relation between the words that is estimated in step ST8 to the display device 300 (step ST9), and ends the processing.

As described above, the first embodiment includes: the word search unit 101 searching the word vector database 103 for each of words included in a word pair input thereto; the word vector extracting unit 102 extracting a word vector corresponding to each of the searched words from the word vector database 103; the character vector converting unit 104 converting characters included in the word pair into a character vector; the feature amount acquiring unit 105 acquiring a feature amount by combining the extracted word vector of each of the words and the character vector being generated by converting; and the estimation unit 106 estimating the semantic relation between the words from the acquired feature amount. Therefore, it is possible to estimate the semantic relation between the words using, as a feature amount, the character vector representing the meaning of characters in addition to the word vectors representing the meaning of the words. As a result, it is possible to accurately estimate the semantic relation between two words that can be antonyms, estimation of the semantic relation of which is difficult if with word vector alone.

Second Embodiment

In a second embodiment, a configuration for estimating a semantic relation between words from a word pair including an unknown word is described.

Figure 4:
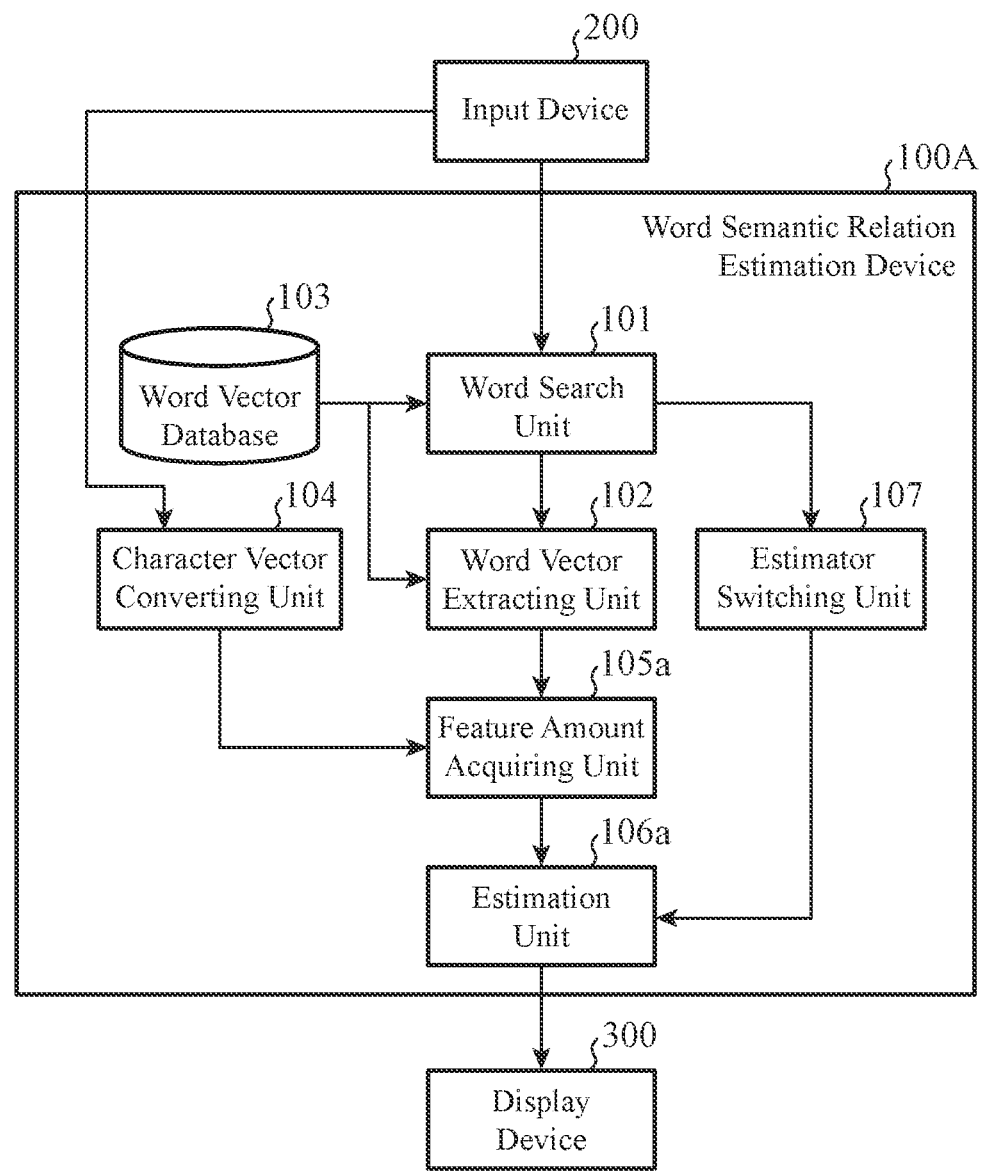
FIG. 4 is a block diagram illustrating a configuration of a word semantic relation estimation device according to a second embodiment.

FIG. 4 is a block diagram illustrating a configuration of a word semantic relation estimation device 100A according to the second embodiment.

The word semantic relation estimation device 100A is configured by adding an estimator switching unit 107 to the word semantic relation estimation device 100 of the first embodiment illustrated in FIG. 1. In addition, a feature amount acquiring unit 105a and an estimation unit 106a are included instead of the feature amount acquiring unit 105 and the estimation unit 106 of the word semantic relation estimation device 100 of the first embodiment illustrated in FIG. 1.

In the following description, the same symbols as those used in the first embodiment are provided to the same or corresponding components as those of the word semantic relation estimation device 100 according to the first embodiment, and the explanation thereof is omitted or simplified.

A word pair input to an input device 200 may include a word that does not exist in a word vector database 103, that is, an unknown word. In a case where an unknown word is included in a word pair, the word semantic relation estimation device 100 described in the first embodiment cannot estimate the semantic relation between the words since no word vector of the unknown word is extracted. Therefore, in the word semantic relation estimation device 100A of the second embodiment, in a case where an unknown word is included in a word pair, the estimator switching unit 107 switches an estimator used for estimation in the estimation unit 106a.

First, a word search unit 101 searches a word vector database 103 for each word included in the word pair, as in the first embodiment. The word search unit 101 determines whether there are one or more search results for each of the words. The word search unit 101 outputs the determination result to the estimator switching unit 107. When it is determined that there are one or more search results for each of the words, the word search unit 101 outputs the search result to a word vector extracting unit 102.

The estimator switching unit 107 determines which one of a first estimator, which uses word vectors and a character vector as the feature amount, and a second estimator which uses character vector alone as the feature amount is to be used as the estimation unit 106a depending on the determination result of the word search unit 101. That is, the estimator switching unit 107 determines to use the first estimator when a determination result that there are one or more search results is input from the word search unit 101, and determines to use the second estimator when a determination result that there is no search result is input. The estimator switching unit 107 instructs the estimation unit 106a to use a determined estimator.

When word vectors are input from the word vector extracting unit 102, the feature amount acquiring unit 105a combines the word vectors and a character vector generated by converting by a character vector converting unit 104 to acquire a feature amount. On the other hand, when no word vector is input from the word vector extracting unit 102, the feature amount acquiring unit 105a acquires the character vector generated by converting by the character vector converting unit 104 as a feature amount.

The estimation unit 106a performs switching between the first estimator and the second estimator on the basis of the instruction to switch the estimators that is input from the estimator switching unit 107. When switched to the first estimator, the estimation unit 106a uses the first estimator to estimate the semantic relation between words from the feature amount obtained by combining the word vectors and the character vector input from the feature amount acquiring unit 105a. Meanwhile, when switched to the second estimator, the estimation unit 106a uses the second estimator to estimate the semantic relation between words from the feature amount of the character vector input from the feature amount acquiring unit 105a.

Next, a hardware configuration example of the word semantic relation estimation device 100A will be described. Note that description of the same configuration as that of the first embodiment is omitted.

The estimator switching unit 107, the feature amount acquiring unit 105a, and the estimation unit 106a in the word semantic relation estimation device 100A correspond to the processing circuit 100b illustrated in FIG. 2A or the processor 100c that executes a program stored in the memory 100d illustrated in FIG. 2B.

Next, an operation of the word semantic relation estimation device 100A will be described with reference to a flowchart of FIG. 5.

Figure 5:
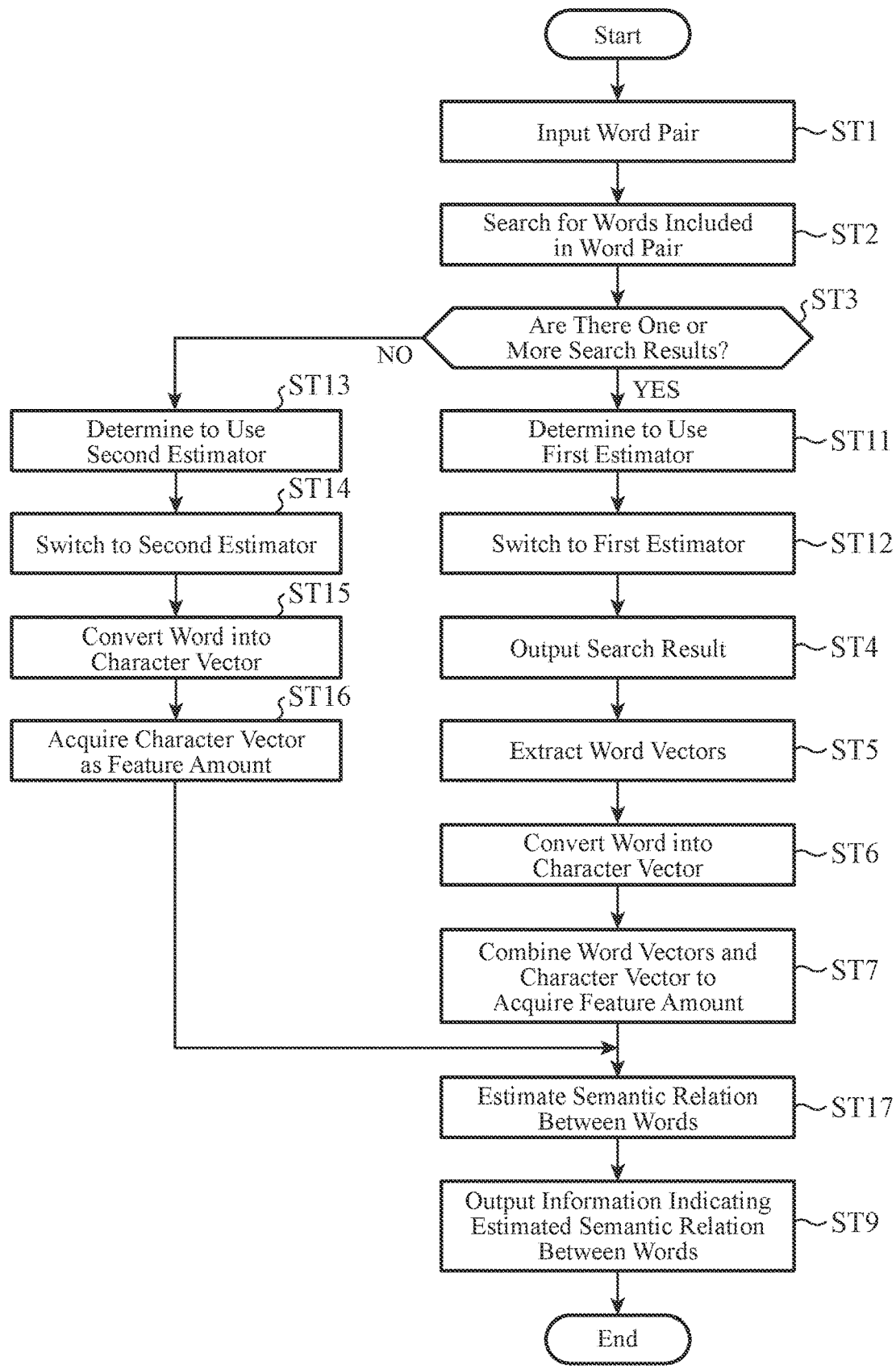
FIG. 5 is a flowchart illustrating an operation of the word semantic relation estimation device according to the second embodiment.

FIG. 5 is a flowchart illustrating the operation of the word semantic relation estimation device 100A according to the second embodiment.

Note that steps same as those of the word semantic relation estimation device 100 according to the first embodiment of the invention are denoted by the same symbols as those used in FIG. 3 and description thereof is omitted or simplified below.

In step ST3, if the word search unit 101 determines that there are one or more search results (step ST3: YES), the estimator switching unit 107 determines to use the first estimator as the estimation unit 106a on the basis of the determination result (step ST11). The estimator switching unit 107 instructs the estimation unit 106a to use the first estimator. The estimation unit 106a performs switching of the estimation unit 106a on the basis of the instruction from the estimator switching unit 107 (step ST12). Thereafter, the word semantic relation estimation device 100A performs the processing from step ST4 to step ST7.

On the other hand, if the word search unit 101 determines that there is no search result in step ST3 (step ST3: NO), the estimator switching unit 107 determines to use the second estimator as the estimation unit 106a on the basis of the determination result (step ST13). The estimator switching unit 107 instructs the estimation unit 106a to use the second estimator. The estimation unit 106a performs switching of the estimation unit 106a on the basis of the instruction from the estimator switching unit 107 (step ST14).

The character vector converting unit 104 divides the words included in the word pair input in step ST1 into each character and converts them into a character vector (step ST15). The character vector converting unit 104 outputs the character vector generated by the conversion to the feature amount acquiring unit 105a. The feature amount acquiring unit 105a acquires the character vector obtained by the conversion in step ST15 as a feature amount (step ST16). The feature amount acquiring unit 105a outputs the acquired feature amount to the estimation unit 106a.

The estimation unit 106a uses an estimator switched to in step ST12 or step ST14 to estimate the semantic relation between the words from a feature amount acquired in step ST7 or step ST16 (step ST17). The estimation unit 106a outputs information indicating the semantic relation between the words estimated in step ST17 to a display device 300 (step ST9), and ends the processing.

As described above, since the second embodiment further includes the estimator switching unit 107 switching, on the basis of whether the word search unit 101 retrieved each of the words from the word vector database 103, between the first estimator estimating the semantic relation between the words using the word vector and the character vector as the feature amount and the second estimator estimating the semantic relation between the words using the character vector alone as the feature amount. The feature amount acquiring unit 105a acquires a feature amount by combining the word vector and the character vector in a case where the word search unit 101 retrieved each of the words from the word vector database 103, and acquires the character vector as the feature amount in a case where each of the words cannot be retrieved from the word vector database. The estimation unit 106a estimates the semantic relation between the words from the feature amount acquired by the feature amount acquiring unit 105a by using one of the first estimator and the second estimator depending on the switching of the estimator switching unit 107. Therefore, even in a case where an unknown word is included in an input word pair, it is possible to estimate the semantic relation between the words by switching the estimators.

Third Embodiment

In a third embodiment, in a case where an unknown word is included in an input word pair, a word that partially matches a character string included in the unknown word is searched for to estimate the semantic relation between the words.

Figure 6:
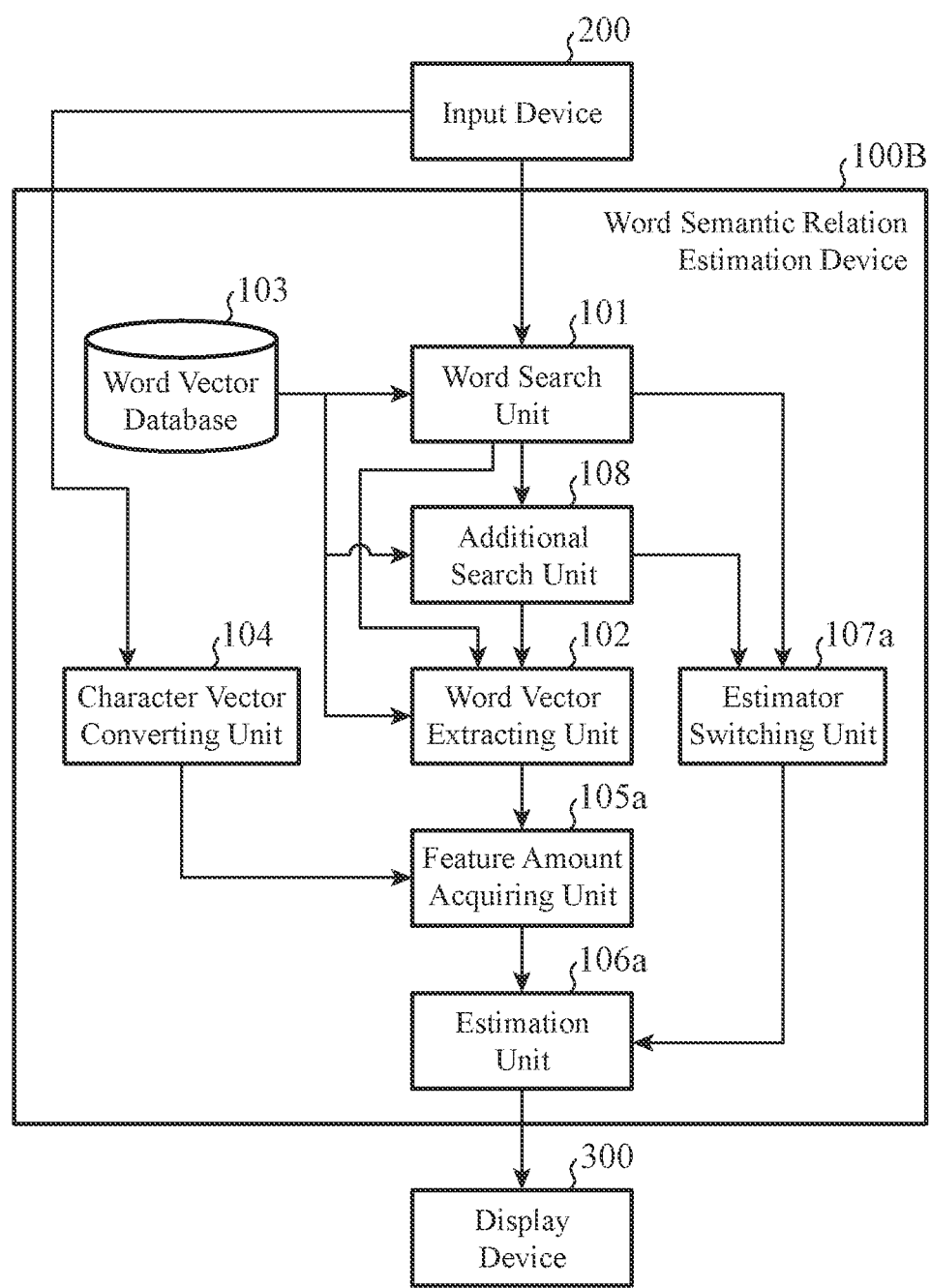
FIG. 6 is a block diagram illustrating a configuration of a word semantic relation estimation device according to a third embodiment.

FIG. 6 is a block diagram illustrating a configuration of a word semantic relation estimation device 100B according to the third embodiment.

The word semantic relation estimation device 100B is obtained by adding an additional search unit 108 to the word semantic relation estimation device 100A of the second embodiment illustrated in FIG. 4. In addition, an estimator switching unit 107a is included instead of the estimator switching unit 107 of the word semantic relation estimation device 100A of the second embodiment illustrated in FIG. 4.

In the following description, the same symbols as those used in the second embodiment are provided to the same or corresponding components as those of the word semantic relation estimation device 100A according to the second embodiment, and explanation thereof is omitted or simplified.

A word pair input to an input device 200 may include a word that does not exist in a word vector database 103, that is, an unknown word. In a case where a word pair includes an unknown word, the word semantic relation estimation device 100A illustrated in the second embodiment switches the estimator of the estimation unit 106a to estimate the semantic relation between the words using a character vector as the feature amount. Meanwhile in the word semantic relation estimation device 100B according to the third embodiment, in a case where an unknown word is included in a word pair, the additional search unit 108 further searches for a word partially matching a character string included in the unknown word from the word vector database 103.

First, a word search unit 101 searches a word vector database 103 for each word included in the word pair, as in the first embodiment. When it is determined that there are one or more search results, the word search unit 101 notifies the estimator switching unit 107a of the determination result and outputs the search result to the word vector extracting unit 102. On the other hand, when it is determined that there is no search result, the word search unit 101 outputs each of the words included in the word pair to the additional search unit 108.

The additional search unit 108 acquires a partial word from each of the words input from the word search unit 101. The additional search unit 108 searches the word vector database 103 for the acquired partial word. The additional search unit 108 outputs a determination result as to whether there are one or more search results to the estimator switching unit 107a. When it is determined that there are one or more search results, the additional search unit 108 outputs the search results to the word vector extracting unit 102.

The estimator switching unit 107a determines which one of a first estimator, which uses word vectors and a character vector as the feature amount, and a second estimator which uses a character vector alone as the feature amount is to be used as an estimation unit 106a depending on the search results input from the word search unit 101 and the search results input from the additional search unit 108. That is, the estimator switching unit 107a determines to use the first estimator when referring to the search results input from the word search unit 101 and there are one or more search results and when referring to the search results input from the additional search unit 108 and there are one or more search results. On the other hand, the estimator switching unit 107a determines to use the second estimator when referring to the search results input from the word search unit 101 and there is no search results and when referring to the search results input from the additional search unit 108 and there is no search result. The estimator switching unit 107a instructs the estimation unit 106a to use the determined estimator.

The word vector extracting unit 102 extracts word vectors corresponding to the word retrieved by the word search unit 101 or the partial word retrieved by the additional search unit 108 from the word vector database 103. The word vector extracting unit 102 outputs the extracted word vectors to a feature amount acquiring unit 105a.

Like in the second embodiment, when word vectors are input from the word vector extracting unit 102, the feature amount acquiring unit 105a combines the word vectors and a character vector obtained by the conversion by the character vector converting unit 104 to acquire a feature amount. On the other hand, when no word vector is input from the word vector extracting unit 102, the feature amount acquiring unit 105a acquires the character vector obtained by the conversion by the character vector converting unit 104 as a feature amount.

Like in the second embodiment, the estimation unit 106a performs switching between the first estimator and the second estimator on the basis of the instruction to switch the estimator that is input from the estimator switching unit 107a. When switched to the first estimator, the estimation unit 106a uses the first estimator to estimate the semantic relation between words from the feature amount obtained by combining the word vectors and the character vector input from the feature amount acquiring unit 105a. Meanwhile, when switched to the second estimator, the estimation unit 106a uses the second estimator to estimate the semantic relation between words from the feature amount of the character vector input from the feature amount acquiring unit 105a.

Next, a hardware configuration example of the word semantic relation estimation device 100B will be described. Note that description of the same configuration as that of the first embodiment is omitted.

The estimator switching unit 107a, the feature amount acquiring unit 105a, the estimation unit 106a, and the additional search unit 108 in the word semantic relation estimation device 100B correspond to the processing circuit 100b illustrated in FIG. 2A or the processor 100c that executes a program stored in the memory 100d illustrated in FIG. 2B.

Next, the processing of the additional search unit 108 will be described with a specific example.

As an example, a case where the additional search unit 108 searches the word vector database 103 for the word "syun-rei-tou (instant freezing)", which is represented by three Chinese characters respectively corresponding to "syun", "rei", and "tou", that is not registered in the word vector database 103 will be described. The additional search unit 108 acquires, for example, partial words of two characters for "syun-rei-tou." The additional search unit 108 acquires character strings of "syun-rei" and "rei-tou" included in "syun-rei-tou" as partial words. The additional search unit 108 searches the word vector database 103 for partial words of "syun-rei" and "rei-tou." Here, it is assumed that "rei-tou" (freezing) is registered in the word vector database 103. The additional search unit 108 refers to the word vector database 103 and acquires the partial word "rei-tou" as a search result. The additional search unit 108 determines that there are one or more search results.

In this manner, the additional search unit 108 extracts word vector of "rei-tou" instead of the word "syun-rei-tou". The additional search unit 108 searches for another word having a meaning close to the unknown word, using the characters included in the unknown word as clues, and the word vector extracting unit 102 converts the other word having a meaning close to the unknown word into a word vector.

Note that, although the case in which the additional search unit 108 acquires partial words of two characters is described in the above example, the additional search unit 108 may acquire partial words by varying the number of characters, such as partial words of three characters. In a case where, as a result, the additional search unit 108 acquires a plurality of partial words of respective number of characters as search results, the word vector extracting unit 102 may extract an average vector of word vectors of the partial words as a word vector. Furthermore, in the case of using an average vector, the word vector extracting unit 102 may calculate the average vector by assigning a weight corresponding to the number of characters of a matched partial word, assuming that a matched word having a larger number of characters has a closer meaning to that of the unknown word.

Next, an operation of the word semantic relation estimation device 100B will be described.

Figure 7:
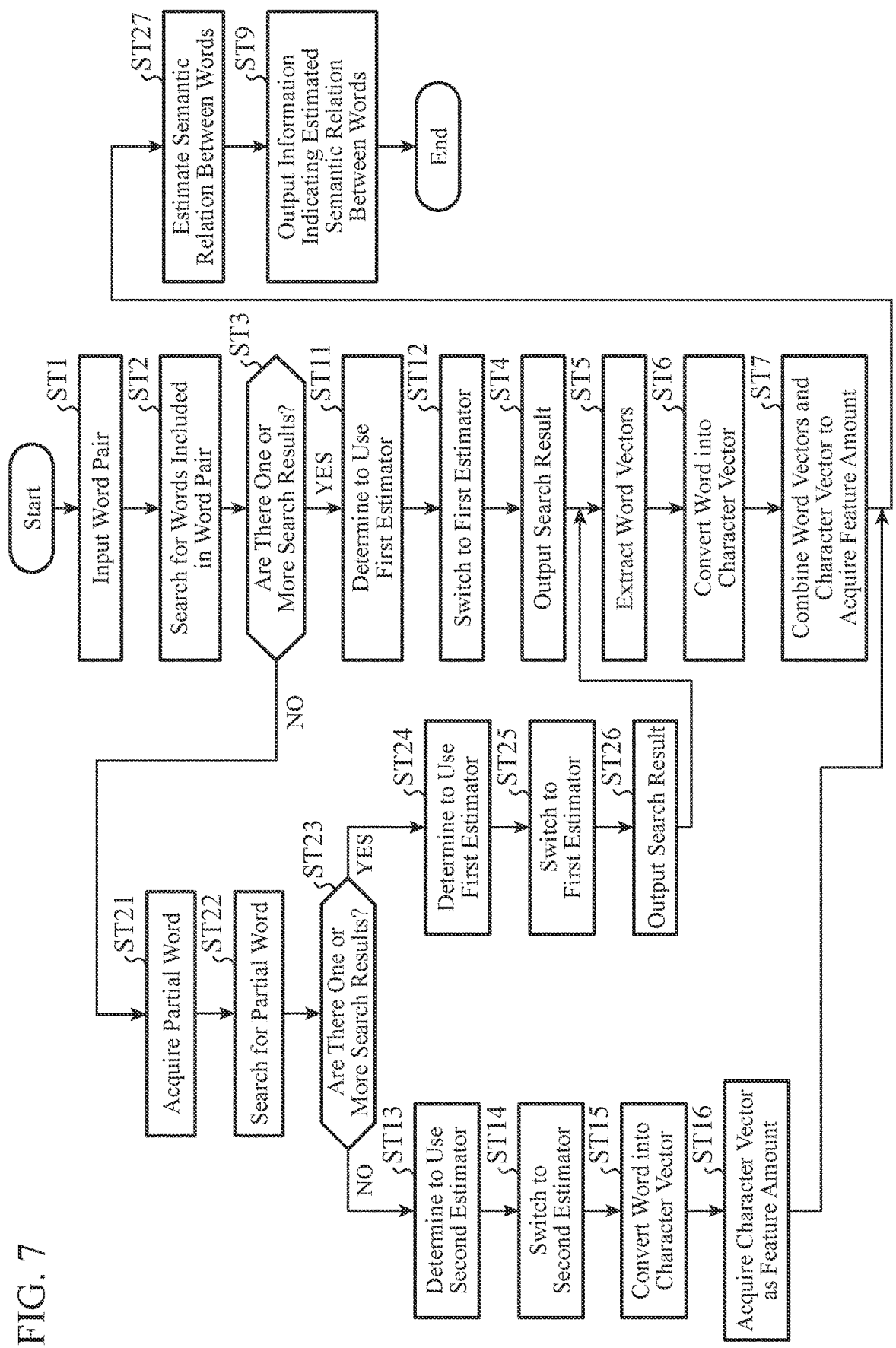
FIG. 7 is a flowchart illustrating an operation of the word semantic relation estimation device according to the third embodiment.

FIG. 7 is a flowchart illustrating the operation of the word semantic relation estimation device 100B according to the third embodiment of the invention.

Note that steps same as those of the word semantic relation estimation device 100A according to the second embodiment of the invention are denoted by the same symbols as those used in FIG. 5 and description thereof is omitted or simplified below.

In step ST3, when the word search unit 101 determines that there are one or more search results (step ST3: YES), the processing of steps ST11, ST12, and steps ST4 to ST7 is performed like in the second embodiment. On the other hand, if the word search unit 101 determines in step ST3 that there is no search result (step ST3: NO), the word search unit 101 outputs each of the words included in the word pair to the additional search unit 108. The additional search unit 108 acquires a partial word from the words input from the word search unit 101 (step ST21). The additional search unit 108 searches the word vector database 103 for the partial word acquired in step ST21 (step ST22). The additional search unit 108 determines whether there are one or more search results (step ST23).

If it is determined that there are one or more search results (step ST23: YES), the estimator switching unit 107a determines to use the first estimator as the estimation unit 106a on the basis of the determination result (step ST24). The estimator switching unit 107a instructs the estimation unit 106a to use the first estimator. The estimation unit 106a performs switching of the estimation unit 106a on the basis of the instruction from the estimator switching unit 107a (step ST25). The additional search unit 108 outputs the search results to the word vector extracting unit 102 (step ST26). Then, the word semantic relation estimation device 100B performs the processing from step ST5 to step ST7.

On the other hand, if it is determined that there is no search result (step ST23: NO), the processing from step ST13 to step ST16 is performed. The estimation unit 106a uses an estimator switched to in step ST12, ST25, or ST14 to estimate the semantic relation between the words from a feature amount acquired in step ST7 or ST16 (step ST27). The estimation unit 106a outputs information indicating the semantic relation between words estimated in step ST27 to the display device 300 (step ST9), and ends the processing.

As described above, the third embodiment further includes: the additional search unit 108 searching the word vector database 103 for a word that partially matches characters included in an unknown word included in a word pair in a case where the word search unit 101 cannot retrieve each of the words from the word vector database 103. The estimator switching unit 107a switches between the first estimator and the second estimator on the basis of whether the additional search unit 108 retrieved a word that partially matches characters included in the unknown word from the word vector database 103. The feature amount acquiring unit 105a acquires a feature amount obtained by combining the word vector and the character vector in a case where the additional search unit 108 retrieved a word that partially matches characters included in the unknown word from the word vector database 103 and, in a case where no word that partially matches a character included in the unknown word is retrieved from the word vector database 103, acquires the character vector as a feature amount. Therefore, it is possible to estimate the semantic relation between words using a word vector of another word having a meaning close to that of the unknown word, using characters included in the unknown word as a clue.

Note that, although in the above description of the third embodiment, the additional search unit 108 is added to the word semantic relation estimation device 100A described in the second embodiment, the word semantic relation estimation device 100 described in the first embodiment may be added with an additional search unit 108.

In this case, an additional search unit 108 is provided which searches the word vector database 103 for a word that partially matches characters included in an unknown word included in a word pair in a case where the word search unit 101 cannot retrieve each of the words from the word vector database 103, and the word vector extracting unit 102 searches the word vector database 103 for a word vector corresponding to the word partially matching the characters included in the unknown word retrieved by the additional search unit 108. With this configuration, it is possible to estimate the semantic relation between words using a word vector of another word having a meaning close to that of the unknown word, using characters included in the unknown word as a clue.

Fourth Embodiment

In the first to third embodiments described above, the configurations are described in which the estimation units 106 and 106a each including an estimator using a thesaurus as training data to estimate semantic relation between words. In a fourth embodiment, a configuration is described in which a distance in vertical relations of a word pair, that is, the degree of extraction is estimated when the estimation units 106 and 106a each estimate the semantic relation of the input word pair on the basis of structure information of the thesaurus. This enables adjustment of the degree of extraction of a word to be replaced, for example in a case where a sentence is generated in which an input sentence is rephrased.

In addition to the processing of estimating the semantic relation of a word pair by inputting the feature amount acquired by the feature amount acquiring units 105 and 105a into an estimator described in the first to third embodiments, the estimation units 106 and 106a estimate the degree of extraction of the estimated semantic relation of the word pair. Here, the degree of extraction of the semantic relation of a word pair means a distance in the vertical relations of the word pair. The estimation units 106 and 106a obtain the degree of extraction of the semantic relation between a word pair from structure information of the thesaurus.

Figure 8:
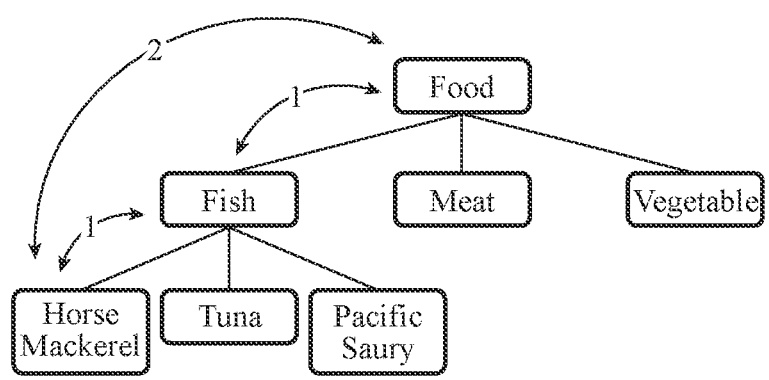
FIG. 8 is a diagram illustrating vertical relations of words registered in a thesaurus.

FIG. 8 is a diagram illustrating vertical relations of words registered in a thesaurus.

In the example of FIG. 8, focusing on the word "horse mackerel" defined immediately below the word "fish", the degree of extraction of the words "fish" and "horse mackerel" is "1". The degree of extraction of "food", defined above the word "fish", and the word "horse mackerel" is "2". The estimation units 106 and 106a obtain the degree of extraction of the semantic relation of a word pair on the basis of, for example, the definition illustrated in FIG. 8.

In a case of generating a paraphrase sentence using an estimation result of the word semantic relation estimation device 100, 100A, or 100B, if replacement is made with an above word having a higher degree of extraction, information necessary for asking and answering a question may be lost. For example, let us consider the case where a sentence "How can we freeze tuna without losing flavor?" is rephrased to "How can we freeze food without losing flavor?" In the above paraphrase, "tuna" is replaced with "food". Referring to the definition illustrated in FIG. 8, the degree of extraction of the words "tuna" and "food" is "2". When paraphrasing is performed using a word having a high degree of extraction as in this example, the sentence before the paraphrasing is a "question about fish", whereas the sentence after the paraphrasing is missing the information of "fish".

The estimation units 106 and 106a obtain the degree of extraction of words and output it as an estimation result.

Thus, a replacement word can be selected using the degree of extraction as an index for selecting the replacement word.

A resulting paraphrase of the above sentence "How can we freeze tuna without losing flavor?" is shown below together with the degree of extraction.

(1) Exemplary paraphrase in a case where the degree of extraction is "2" (high degree of extraction)

Before paraphrasing: How can we freeze tuna without losing flavor?

After paraphrasing: How can we freeze food without losing flavor?

(2) Exemplary paraphrase in a case where the degree of extraction is "1" (normal degree of extraction)

Before paraphrasing: How can we freeze tuna without losing flavor?

After paraphrasing: How can we freeze fish without losing flavor?

As described above, according to the fourth embodiment, the estimation units 106 and 106a estimate the degree of extraction indicating a vertical distance in a hierarchical relation between the words, for which the semantic relation is estimated, on the basis of the structure information of training data of the estimator that estimates the semantic relation between the words. Thus it is possible to replace words reflecting the structure information of the thesaurus.

Other than the above, within the scope of the present invention, the present invention may include a flexible combination of the respective embodiments, a modification of any component of the respective embodiments, or omission of any component in the respective embodiments.

INDUSTRIAL APPLICABILITY

The word semantic relation estimation device according to the present invention is suitable for use in an information search system that is demanded to properly handle antonyms in technology that handles natural language such as document search technology.

REFERENCE SIGNS LIST

100, 100A, 100B: Word semantic relation estimation device, 101: Word search unit, 102: Word vector extracting unit, 103: Word vector database, 104: Character vector converting unit, 105, 105a: Feature amount acquiring unit, 106, 106a: Estimation unit, 107, 107a: Estimator switching unit, 108: Additional search unit.

The invention claimed is:

1. A word semantic relation estimation device, comprising:
   a processing circuitry
   to search, as a word searcher, a database for each of words included in a word pair input to the word semantic relation estimation device;
   to extract, as a word vector extractor, a word vector corresponding to each of the words searched by the word searcher from the database;
   to convert characters included in the word pair into a character vector;
   to acquire, as a feature amount acquirer, a feature amount by combining the word vector of each of the words and the character vector;
   to estimate, as an estimator, a semantic relation between the words from the feature amount acquired by the feature amount acquiring unit; and
   to switch, as an estimator switcher, on a basis of whether the word searcher retrieved each of the words from the database, between a first estimator estimating the semantic relation between the words using the word vector and the character vector as the feature amount and a second estimator estimating the semantic relation between the words using the character vector alone as the feature amount, wherein the feature amount acquirer acquires the feature amount by combining the word vector and the character vector in a case where the word searcher retrieved each of the words from the database, and acquires the character vector as the feature amount in a case where the word searcher cannot retrieve each of the words from the database, and the estimator estimates the semantic relation between the words from the feature amount acquired by the feature amount acquirer by using one of the first estimator and the second estimator depending on the switching of the estimator switcher.

2. The word semantic relation estimation device according to claim 1, wherein the processing circuitry searches, as an additional searcher, the database for a word that partially matches characters included in an unknown word included in the word pair in a case where the word searcher cannot retrieve each of the words from the database, wherein the word vector extractor searches the database for a word vector corresponding to the word that partially matches the characters included in the unknown word searched by the additional searcher.

3. The word semantic relation estimation device according to claim 1, wherein the processing circuitry searches, as an additional searcher, the database for a word that partially matches characters included in an unknown word included in the word pair in a case where the word searcher cannot retrieve each of the words from the database, wherein the estimator switcher switches the first estimator and the second estimator on a basis of whether the additional searcher retrieved a word that partially matches characters included in the unknown word from the database, and the feature amount acquirer acquires a feature amount obtained by combining the word vector and the character vector in a case where the additional searcher retrieved a word that partially matches characters included in the unknown word from the database and, in a case where no word that partially matches a character included in the unknown word is retrieved from the database, acquires the character vector as a feature amount.

4. The word semantic relation estimation device according to claim 1, wherein the estimator estimates a degree of extraction indicating a vertical distance in a hierarchical relation between the words, for which the semantic relation is estimated, on a basis of structure information of training data of an estimator that estimates the semantic relation between the words.

5. A word semantic relation estimation method comprising:

searching, by a word searcher, a database for each of words included in a word pair which is input;

extracting, by a word vector extractor, a word vector corresponding to each of the words searched by the word searcher from the database, converting, by a character vector converter, characters included in the word pair into a character vector;

acquiring, by a feature amount acquirer, a feature amount by combining the word vector of each of the words extracted by the word vector extractor and the character vector generated by converting the characters by the character vector converter;

estimating, by an estimator, a semantic relation between the words from the feature amount acquired by the feature amount acquirer; and switching, by an estimator switcher, on a basis of whether the word searcher retrieved each of the words from the database, between a first estimator estimating the semantic relation between the words using the word vector and the character vector as the feature amount and a second estimator estimating the semantic relation between the words using the character vector alone as the feature amount, wherein the feature amount acquirer acquires the feature amount by combining the word vector and the character vector in a case where the word searcher retrieved each of the words from the database, and acquires the character vector as the feature amount in a case where the word searcher cannot retrieve each of the words from the database, and the estimator estimates the semantic relation between the words from the feature amount acquired by the feature amount acquired by using one of the first estimator and the second estimator depending on the switching of the estimator switcher.

\* \* \* \* \*